Feb. 23, 1926.                         1,573,877
A. V. SMITH ET AL
COLLAPSIBLE TOP
Filed July 16, 1924         2 Sheets-Sheet 2
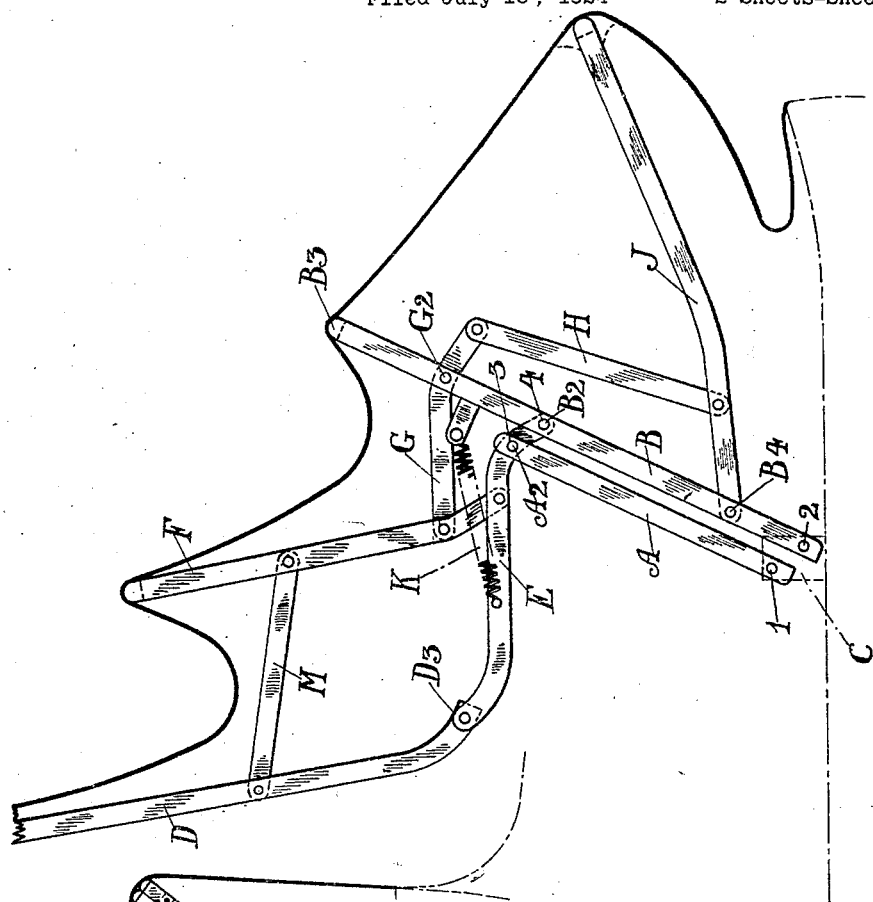
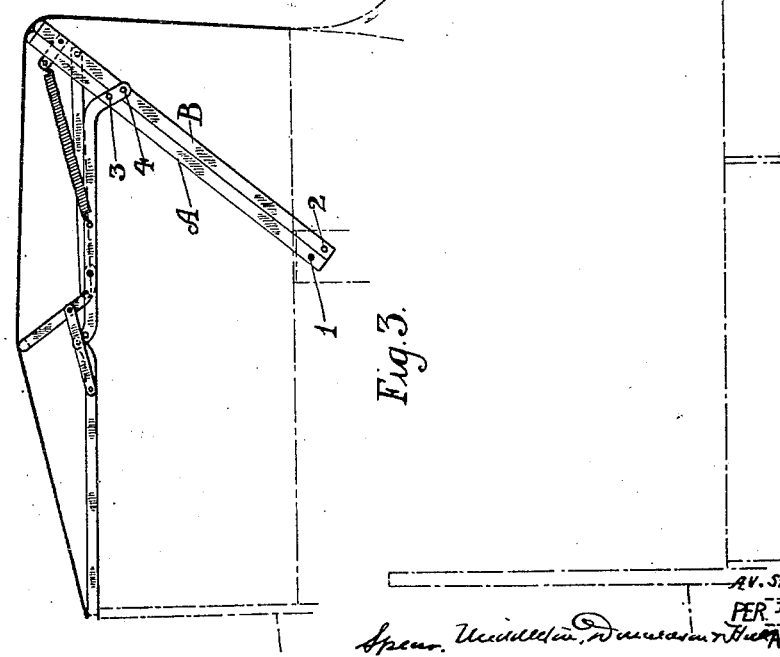

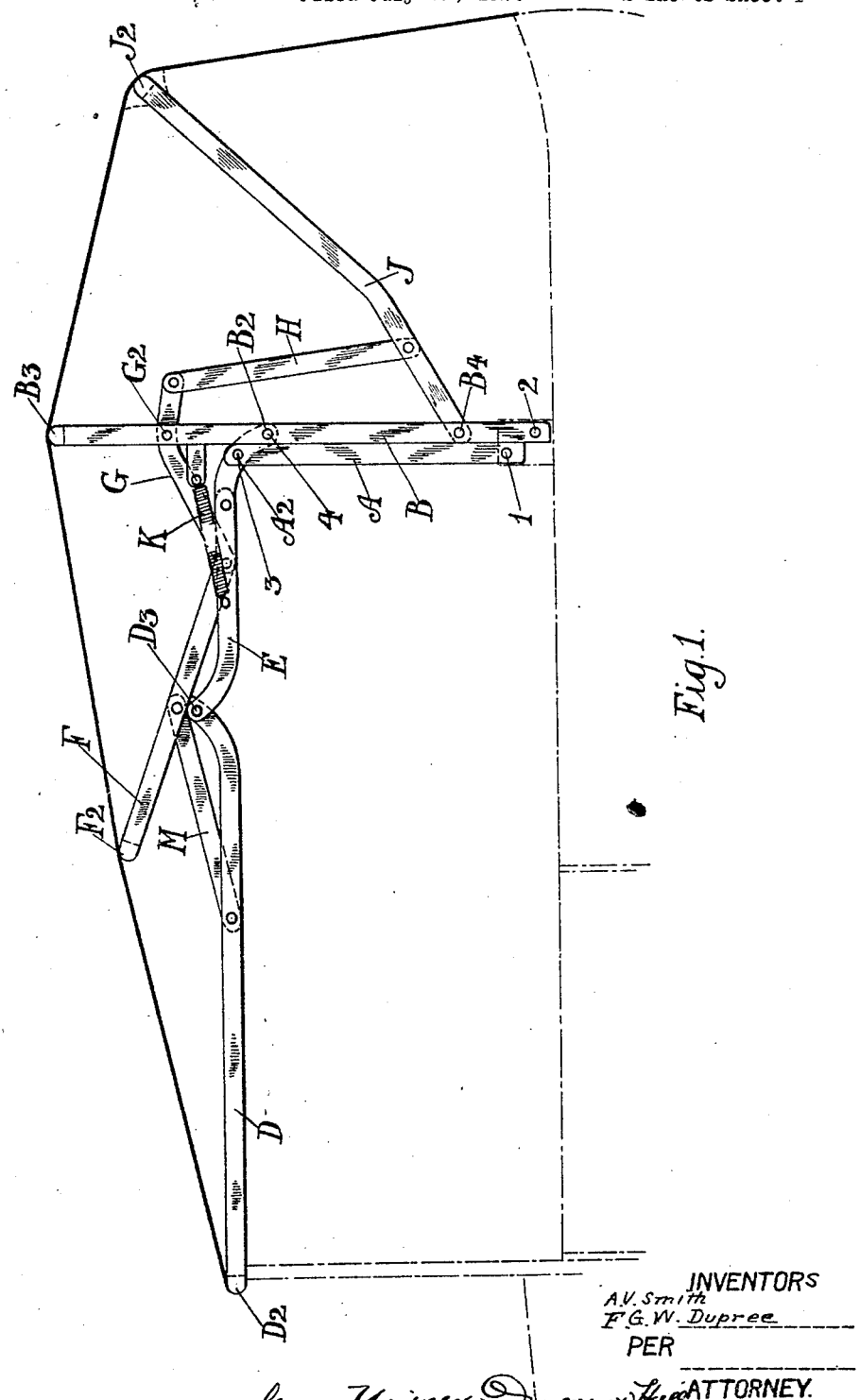

Patented Feb. 23, 1926.

1,573,877

UNITED STATES PATENT OFFICE.

ARTHUR VINCENT SMITH AND FREDERICK GEORGE WILLIAM DUPREE, OF COVENTRY, ENGLAND.

COLLAPSIBLE TOP.

Application filed July 16, 1924. Serial No. 726,366.

*To all whom it may concern:*

Be it known that we, ARTHUR VINCENT SMITH, a subject of the King of England, residing at Coventry, in the county of Warwick, England, and FREDERICK GEORGE WILLIAM DUPREE, a subject of the King of England, residing at Coventry, in the county of Warwick, England, have invented certain new and useful Improvements in Collapsible Tops, of which the following is a specification.

This invention relates to cape hoods for use on motor vehicles and the like, of the kind which can be operated single handed. The object of the invention is to provide a simple construction which is easy to raise and lower and in which the use of webbing or the like is not necessary.

Usually this type of hood comprises a single main pillar or stick on each side, to which are pivoted various links carrying the extension and various bows, and the extension and bows are connected together by webbing which limits the opening of the hood and serves as a stop to the forward movement of the main pillars. This webbing is liable to stretch, when the original outline of the hood becomes altered or lost, the hood material sags and becomes unsightly, and the mechanism becomes loose and liable to rattle.

In some cases, however, the main pillar or stick is duplicated at each side and the front bow is connected by a link or lever pivoted to both parts of the duplicated pillar and a spring is provided which tends to assist the opening of the hood.

According to this invention, each main pillar is duplicated, and the parts thereof are adapted to bear against one another when the hood is fully raised and extended, so as to form an efficient stop. The links are all inter-connected with one another and the two pillar members so that they all move in unison, and preferably any two suitable members of the link system are connected together by a tension spring which is fully extended when the hood is lowered. Thus, this tension spring assists raising and extending of the hood throughout the whole movement.

The manner of carrying out the invention is illustrated in the accompanying drawings, in which Figure 1 is a side elevation showing one form of hood fully extended, Figure 2 is a similar view showing the same hood partly lowered, and Figure 3 is a similar view showing a modified construction particularly applicable to short bodies.

Like letters indicate like parts throughout the drawings.

At each side of the hood is supported by a duplicated main pillar comprising the two members A and B which are pivoted to a bracket C on the body, the two pivots 1 and 2 being one above the other, as shown. With this arrangement, when the hood is lowered, the duplicated pillar members A and B lie horizontally above one another. If desired they may then bear against one another for part or the whole of their length so as to limit the downward movement of the hood and cause the usual hood rests to be dispensed with. When the hood is raised the two pillar members A and B bear against one another and the complete pillar cannot move beyond the desired position, which in this case is a vertical one. The pillar members A and B are shown as bearing against one another throughout their whole length, but this is clearly not essential as the pillar members may be spaced and touch one another at points only, but the arrangement illustrated is preferred.

The front bow D is pivoted to a link E hinged at $B^2$ to the pillar member B and at $A^2$ to the pillar member A, and it will be clear that movement of the pillar members A and B from the horizontal to the vertical position causes the front bow D to be extended, and the reverse movement causes it to be collapsed towards the pillar members.

There is an intermediate bow F coupled by a link M to the front bow and pivoted to the link E. This also has pivoted to it a lever G pivoted at $G^2$ to the pillar member B, which is extended across the hood at $B^3$ to form a bow. The rear end of the lever G is coupled by a link H to the rear bow J which is pivoted at $B^4$ to the pillar member B and serves in the usual manner to support the rear corner of the hood.

There are thus four bows transverse to the hood, $D^2$, $F^2$, $B^3$ and $J^2$, and all these bows are connected together, and to the various links and levers described, in such a manner that movement of one bow in relation to another causes all the others to move.

Assuming the hood to be lowered and that it is desired to raise it, the lifting of any one of the bows has the required effect causing the complete hood to rise and the bows to separate in the required manner. This raising and opening of the hood can be assisted by the employment of a balancing spring of any well known type. Preferably, however, the spring is of the tension type shown at K, and it connects together any two suitable links or members of the hood, being fully extended when the hood is almost in its lowest position, further movement into the extreme lowest position causing the spring to contract very slightly, so that the spring has a slight tendency to hold the hood down. As the hood is raised the spring contracts and assists in the movement from the start to the finish. The operation of opening is therefore a very easy one.

As will be seen, it is necessary to provide a second stop between the point $D^3$ and the under side of the link F, but the main stop is effected between the pillar members A and B.

It is not essential that the pillar members A and B should be actually vertical, but with this arrangement, and by providing the under side of the members D and E with straight edges, there is left a rectangular space between the under side of the hood and the body which lends itself very efficiently for the fitting of windows and side curtains.

In some cases it is desired that the pillar should slope backwards as is shown in Figure 3. In such a case the pillar members are so pivoted that they bear against one another when the complete pillar is in the required position. In this case the extension portion of the hood differs from that shown in Figures 1 and 2 but it forms no part of the present invention. It will be noticed, however, that the points 1 and 2, 3 and 4, in both constructions form the corners of a parallelogram.

By this means a very simple hood which can be operated single handed is provided, wherein webbing can be dispensed with and an efficient stop is provided which remains permanent, overcoming the disadvantages of using the webbing as this stop.

The complete hood mechanism opens and closes in unison and the spring assists the movement from the start to the finish of the opening.

What we claim as our invention and desire to secure by Letters Patent of the United States is:—

1. In a hood for a vehicle, the combination of a pillar pivoted at its lower end, linkwork forming the hood framework connected with said pillar, and a second pillar connected with the aforesaid framework adapted to have its edge lie flat against the edge of the first mentioned pillar when the hood is fully erected, thereby to form a stop, substantially as set forth.

2. In a hood for a vehicle, the combination of a pillar hinged at its lower end, hinged linkwork forming the framework of the hood connected to said pillar, and a second pillar connected with the aforesaid hood framework adapted to have its edge lie flat against the edge of the first mentioned pillar when the hood is fully erected and also when the hood is lowered, thereby to form a stop in each each case, substantially as set forth.

3. In a hood for vehicles the combination with a vehicle body of a pillar hinged at its lower end to said body, a second pillar hinged to said body in advance of said first named pillar at a higher elevation and so closely adjacent thereto that the adjacent edges of the pillars abut when the hood is raised.

4. In a hood for vehicles the combination with a vehicle body of a pillar hinged at its lower end to said body, a second pillar hinged to said body in advance of said first named pillar at a higher elevation and so closely adjacent thereto that the adjacent edges of the pillars abut when the hood is raised, the height of the said second hinge above the first being substantially equal to the combined widths of the two pillars whereby their side edges abut when the hood is lowered.

5. In a hood for vehicles, the combination with a vehicle body of a pillar hinged to said body, a bow carried by the upper end of said pillar, a second pillar hinged to said body in advance of said first named pillar and closely adjacent thereto, but at a higher elevation, said second pillar terminating short of the upper end of the first pillar, a link hinged to the upper end of the second pillar and an adjacent portion of the first pillar, and a tension spring connecting said link with the first pillar at a point above the end of the second pillar.

6. In a hood for vehicles, the combination with a vehicle body of a pillar hinged to said body, a bow carried by the upper end of said pillar, a second pillar hinged to said body in advance of said first named pillar and closely adjacent thereto, but at a higher elevation, said second pillar terminating short of the upper end of the first pillar, a link hinged to the upper end of the second pillar and an adjacent portion of the first pillar, an intermediate bow pivoted to said link, a lever pivoted to said first pillar above the end of the second pillar, and extending in front and rear thereof and having its front end hinged to an intermediate bow, a bow hinged to said first pillar and a substantially vertically disposed link connecting the rear end of said lever with said rear bow supporting arm.

7. In a hood for a vehicle, the combination of a first pillar pivoted at its lower end, a second pillar located beside said first pillar pivoted at a different level and adapted to engage said first pillar when the hood is fully erected, a link pivoted to both pillars, a bow carried by said second pillar, a front bow pivoted to said link, an intermediate bow pivoted to said link, a lever also pivoted to said intermediate bow and to said second pillar and extended to the rear thereof, a rear bow supporting the rear corner of the hood pivoted to said second pillar, and a link connecting said rear bow with the rearward extension of said second link.

In testimony whereof we have signed our names to this specification.

ARTHUR VINCENT SMITH.
FREDERICK GEORGE WILLIAM DUPREE.